UNITED STATES PATENT OFFICE.

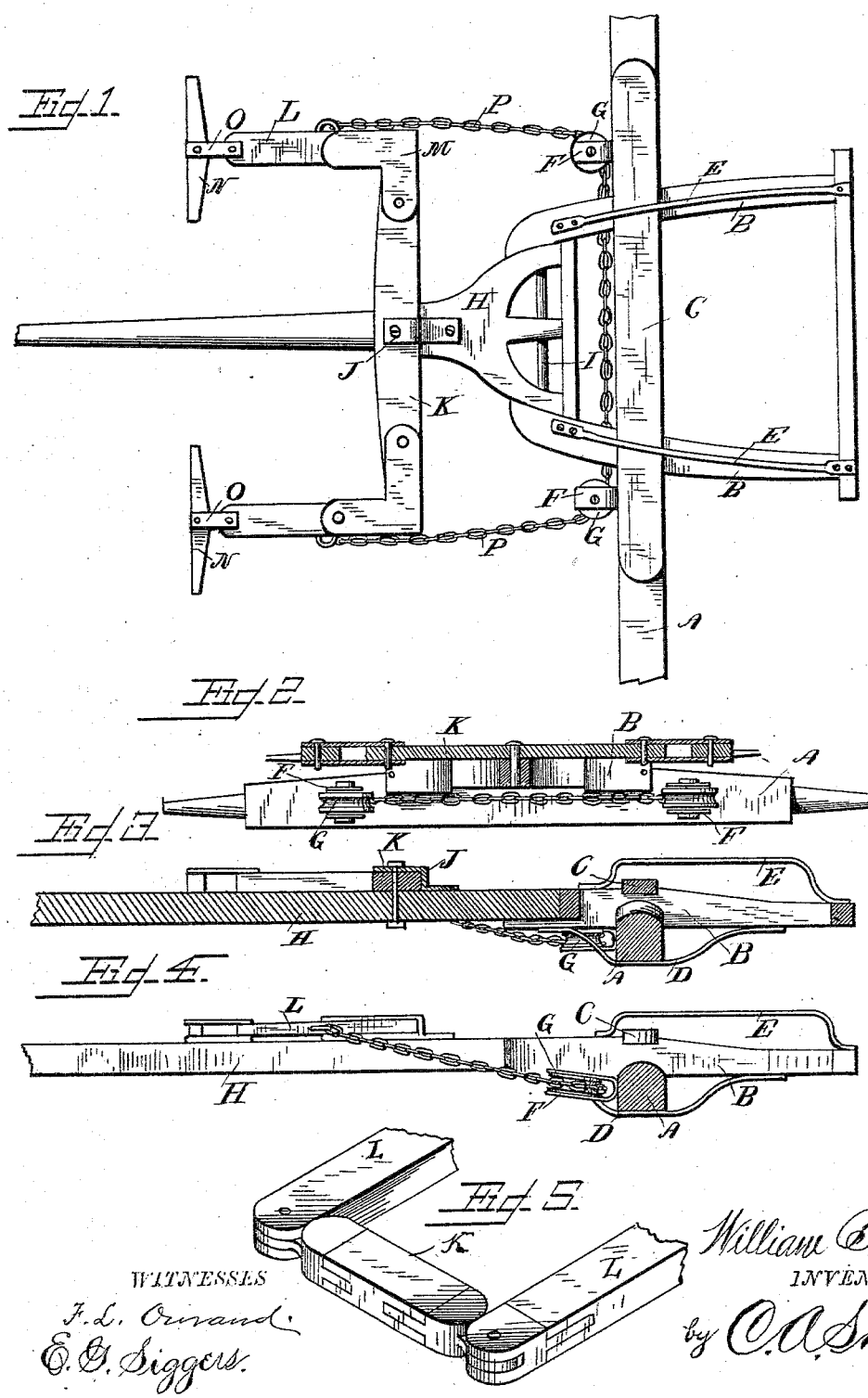

WILLIAM B. HUBBARD, OF GREENVILLE, ILLINOIS.

DRAFT-EQUALIZER.

SPECIFICATION forming part of Letters Patent No. 295,174, dated March 18, 1884.

Application filed January 9, 1884. (No model.)

*To all whom it may concern:*

Be it known that I, WILLIAM B. HUBBARD, a citizen of the United States, residing at Greenville, in the county of Bond and State of Illinois, have invented a new and useful Draft-Equalizer, of which the following is a specification, reference being had to the accompanying drawings.

This invention relates to draft-equalizers arranged to be used in equalizing the draft of two horses; and it has for its object to steady the motion of the vehicle and cause the strain of drawing the same to come upon the strongest part of the vehicle. A further object of my invention is to give a lifting power for the horses, instead of a downward pull, as is generally the case; and a still further object is to obviate the unpleasant and injurious jerks that come upon the horses' shoulders when the vehicle is traveling over rough roads, and allow each horse to draw equally and steadily, and with a yielding easy movement.

With these and other objects in view, the said invention consists in certain details of construction and combination of parts, as hereinafter set forth, and particularly pointed out in the claims.

In the accompanying drawings, Figure 1 is a plan view of my improved draft-equalizer. Fig. 2 is a transverse section on the line $x\ x$, Fig. 1. Fig. 3 is a longitudinal sectional view. Fig. 4 is a side view. Fig. 5 is a view of a modification.

Like letters of reference indicate corresponding parts in the several figures.

Referring to the drawings, A designates the front axle, having the hounds B secured thereto, the bolster C being connected to the hounds, spring-braces D on each side passing beneath the axle and connecting the front and rear ends of the hounds at the under side. Bails or yokes E extend from the front to the rear end of the hounds at the top, on each side, said bails or yokes extending over the bolster, as seen.

F designates U-shaped pulley-blocks secured to the front of the axle, and carrying pulleys or rollers G, said pulleys and blocks being arranged on each side of the axle.

The tongue H is secured to the front ends of the hounds B by a bolt, I, and extends forward in the usual manner, a cap-plate, J, being attached to the rear end of the tongue, and having the double-tree K, pivoted by a bolt between the cap-plate and the tongue.

L designates poles pivoted by angle-plates M to the ends of the double tree, so as to form an elbow-joint for the poles, to the front ends of which are attached the whiffletrees N by means of connecting pivoted swinging links O. Chains P are attached to the outer side of one of the poles L, passes through the pulleys or rollers G, and connects with the pole on the opposite side in a similar manner.

The operation of my invention will be readily understood from the foregoing description, taken in connection with the annexed drawings. The horses are attached to the whiffletrees in the usual manner, and in drawing the vehicle slide the chain through the pulleys or rollers, so as to equalize the draft of the vehicle. By means of this construction, and by connecting the jointed poles by chains to the axle, the draft of the vehicle is down under the hounds, and I provide a lifting power instead of a downward pull. By attaching the whiffletrees to jointed poles connecting with the sides of the axle the draft of the vehicle is from both sides, instead of from the center, as is usually the case, thereby causing the vehicle to run more steadily and with greater ease.

It will be seen that the construction above described takes the sudden hard jerks from off the horses' shoulders, so that when traveling over rough roads, should one of the wheels enter a rut in the road, the joints of the poles L yield, causing the turning of the chain through the rollers or pulleys, and instead of jerking the opposite horse back it does not affect him at all, but simply gives him a chance to go ahead and help draw the vehicle equally with the other horse. My invention obviates the vibration and strain on the tongue and hounds in the ordinary construction, and places it upon the axle, which is well suited to withstand the strain.

When my improved draft-equalizer is used, a balky horse will readily draw the vehicle, since I provide a rolling movement in place of a dead weight.

It will be apparent that my improved draft-equalizer is simple in construction and efficient in operation, and will act to cause the horses to draw equally and with more ease than by the ordinary construction.

I do not limit myself to mere details of construction, as various modifications may be resorted to without departing from the spirit or scope of my invention.

As shown in Fig. 5, I may substitute for the elbow-jointed plates which attach the poles to the double-tree a suitably-constructed straight-jointed plate, either construction effecting the object of my invention.

Having described my invention, I claim as new—

1. In a draft-equalizer, the combination, with the front axle, having pulleys attached thereto, of the whiffletrees secured to poles having a jointed connection with the double-tree, and chains passing through the pulleys and connecting the poles, as set forth.

2. In a draft-equalizer, the combination, with the front axle, having pulleys or rollers attached thereto, of a chain passing through the pulleys or rollers, and whiffletrees connecting with the ends of the chain and having a jointed connection with the double-tree, as and for the purpose set forth.

3. In a draft-equalizer, the combination, with the front axle, having pulleys or rollers attached to the front face thereof, of the chain passing through the pulleys or rollers, a double-tree secured to the tongue, poles having joint-plates connecting with the ends of the double-tree, and whiffletrees attached to the poles, as set forth.

4. In a draft-equalizer, the combination, with the front axle, having pulleys or rollers attached to the front thereof, of the chain passing through the pulleys, poles provided with elbow-joint plates secured to the double-tree and connecting with the ends of the chain, and whiffletrees having a link-connection with the poles, as set forth.

5. In a draft-equalizer, the combination, with the front axle and hounds, and pulleys or rollers attached to the axle, of the tongue pivoted to the front ends of the hounds, a chain passing through the pulleys, poles having a jointed connection with the double-tree, secured to the tongue, and whiffletrees attached to the poles, as set forth.

In testimony that I claim the foregoing as my own I have hereto affixed my signature in presence of two witnesses.

WILLIAM B. HUBBARD.

Witnesses:
    JOSEPH F. FOUKE,
    PETER H. TATE.